May 1, 1923.                          1,453,618
A. C. BOVENDER
MOTOR VEHICLE ATTACHMENT
Filed Nov. 8, 1922            2 Sheets-Sheet 1

Inventor
A. C. Bovender
By C. A. Snow & Co.
Attorneys

May 1, 1923.
A. C. BOVENDER
MOTOR VEHICLE ATTACHMENT
Filed Nov. 8, 1922
1,453,618
2 Sheets-Sheet 2
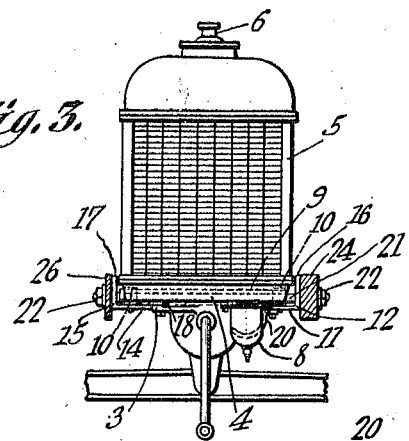
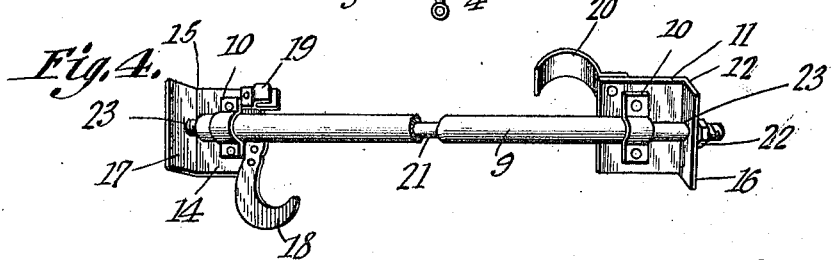
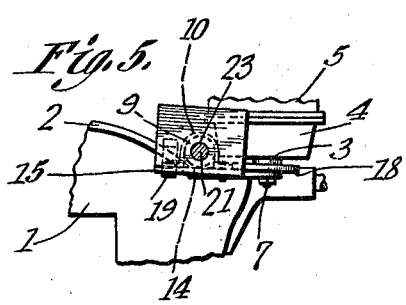
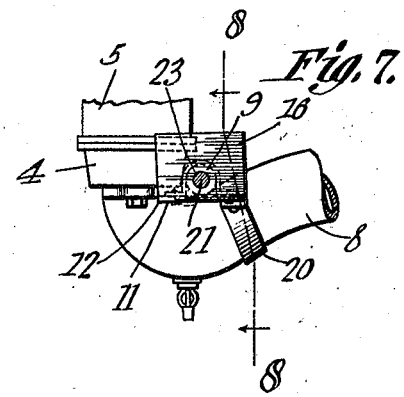
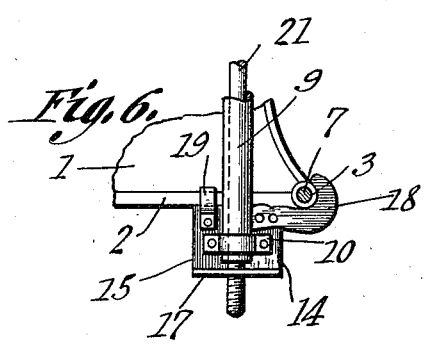
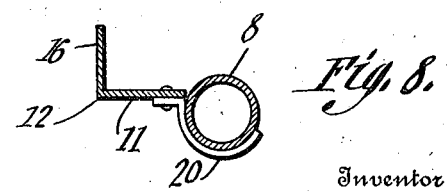
Inventor
A. C. Bovender
Attorneys Patented May 1, 1923.

1,453,618

UNITED STATES PATENT OFFICE.

ALLEY CLAUD BOVENDER, OF NORTHWILKESBORO, NORTH CAROLINA.

MOTOR-VEHICLE ATTACHMENT.

Application filed November 8, 1922. Serial No. 599,736.

*To all whom it may concern:*

Be it known that I, ALLEY C. BOVENDER, a citizen of the United States, residing at Northwilkesboro, in the county of Wilkes and State of North Carolina, have invented a new and useful Motor-Vehicle Attachment, of which the following is a specification.

This invention aims to provide novel means for attaching a wood sawing mechanism to a tractor in such a way that the wood sawing mechanism may be turned up in an out-of-the-way position, when not in use, thereby facilitating the transportation of the wood sawing mechanism on the tractor, and enabling the tractor to be cranked.

Another object of the invention is to provide novel means for assembling the wood sawing mechanism with the tractor frame without working changes in the tractor frame.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
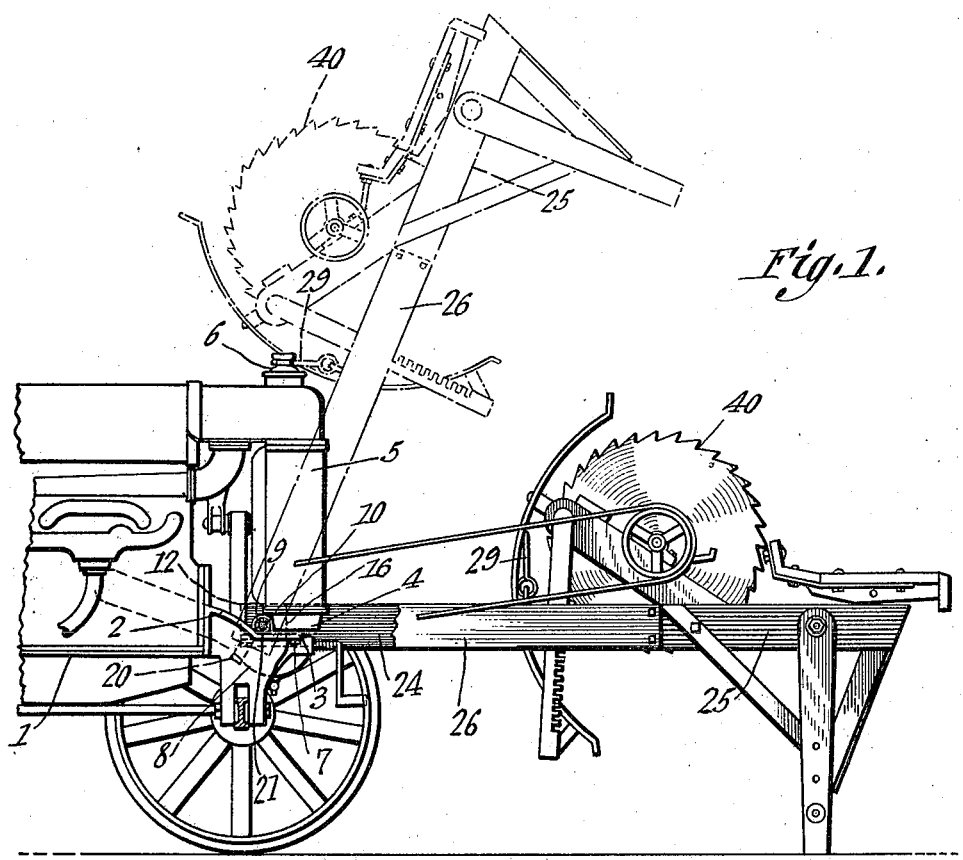
Figure 2:
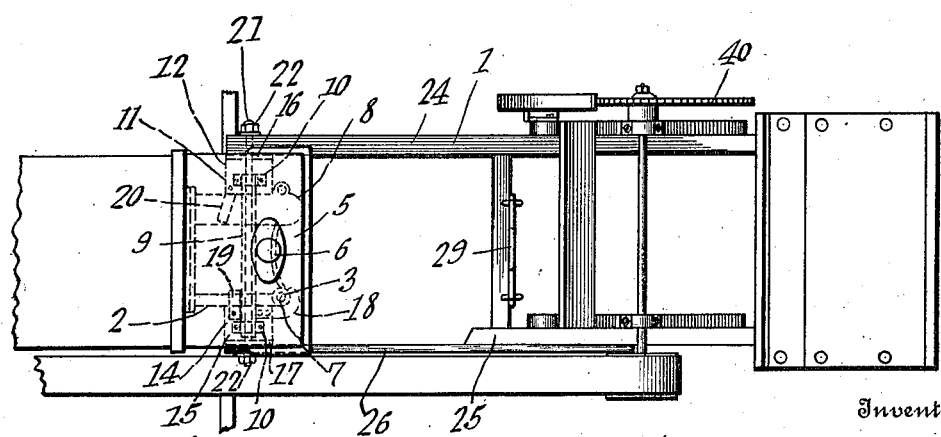

Figure 1 shows in side elevation, a portion of a tractor whereunto the device forming the subject matter of this application has been applied, parts being broken away and parts appearing in section; Figure 2 is a top plan wherein parts are broken away; Figure 3 is a front elevation showing a portion of a tractor to which the device claimed has been applied, parts being in section; Figure 4 is a perspective illustrating the support whereby the sawing mechanism is connected with the tractor, parts being broken away; Figure 5 is an elevation disclosing one end of the support mounted on a portion of the tractor; Figure 6 is a top plan of the structure delineated in Figure 5; Figure 7 is an elevation showing the mounting of the opposite end of the support from that disclosed in Figure 6; and Figure 8 is a section taken approximately on the line 8—8 of Figure 7.

The numeral 1 marks a part of the framework of a Fordson tractor, one wheel of the tractor being designated by the reference letter W. The frame part 1 has an outstanding flange 2, as disclosed in Figures 1, 5 and 6, the flange 2 merging into a lug 3 on the part 1. The numeral 4 designates the base of a radiator 5, the radiator having a filling neck 6, the base 4 of the radiator being held on the member 1 by a securing element 7 passing through the lug 3. The base 4 of the radiator embodies a water pipe 8, shown in Figures 1, 3 and 7.

The parts above alluded to constitute a portion of the standard construction of a Fordson tractor, and no novelty is claimed for them, saving in so far as they may enter into combination with parts hereinafter described.

The structure forming the subject matter of this application includes a main frame, carrying a wood sawing mechanism 40, the frame being connected to the tractor for vertical swinging movement, so that the frame may be swung upwardly into the position shown in dot and dash line in Figure 1. Attention now is directed to the means whereby this frame is assembled with the tractor, and in this connection let reference be had to Figure 4, wherein there appears a tube 9 which is adapted to be lodged, as indicated in Figures 1 and 5, between the upper edge of the frame member 1 and the base 4 of the radiator, and is adapted to be lodged, as shown in Figure 7, between the base 4 of the radiator and the pipe 8. By means of clips 10, the tubular bearing 9 is attached to the horizontal flange 11 of an angle bracket 12 and to the horizontal flange 14 of an angle bracket 15, the bracket 12 having an upstanding vertical flange 16, and the bracket 15 having an upstanding vertical flange 17. A hook-shaped arm 18 is secured to the flange 14 of the angle bracket 15 and projects forwardly, the arm being adapted to engage the lug 3 on the frame member 1, as shown in Figure 6. A fork or retainer 19 is secured to the flange 14 of the angle bracket 15, and projects inwardly, in a direction substantially at right angles to the arm 18. The outer edge of the frame member 1, including the flange 2, is received in the fork or retainer 19, as shown in Figure 6. A curved depending arm 20 is secured to the flange 11 of the angle bracket 12 and fits about the pipe 8 of the radiator 5, as disclosed in Figures 7 and 8. The construction as above described is such that the tube 9 is held on the frame of the tractor, and it is to be observed that this operation may be brought about without boring holes in the tractor frame, or altering a single bolt or other connection which forms part of the tractor frame. In the tubular bearing 9, a shaft 21 is mounted, the shaft passing through openings 23 in the flange 16 of the bracket 12 and in the flange 17 of the bracket 15. Securing devices 22, such as nuts are mounted on the outer ends of the rod or shaft 21.

The main frame which carries the sawing mechanism 40 includes a long side beam 24 and a short side beam 25, a side plate 26 being secured to the beam 25. The rear end of the side beam 24 and the rear end of the side plate 26 are mounted on the ends of the shaft 21, outwardly of the flanges 16 and 17 of the angle brackets 12 and 15, and inwardly of the nuts 22 which are carried by the ends of the shaft 21. The construction is such that the main frame may be swung upwardly from the solid line position of Figure 1 to the dotted line position of that Figure, thereby enabling the frame and parts carried thereby to be transported by the tractor, and, further permitting a cranking of the tractor. In order to hold the main frame in an up-turned position, a bail or latch 29 is mounted on the frame and is adapted to engage the neck 6 of the radiator 5, as shown in Figure 1.

For convenience in claiming the invention, the flanges 11 and 14 of Figure 4 may be denominated first flanges, the flanges 16 and 17 being referred to as second flanges. The parts 18, 19 and 20 constitute attaching elements, and the tube 9, being held on the angle brackets 15 and 12 by the clips 10, constitutes a rigid means whereby the brackets are held apart at a fixed distance.

What is claimed is:—

1. In a device of the class described, a pair of angle members including horizontal and vertical flanges; attaching elements carried by the horizontal flanges; a tubular bearing assembled with the horizontal flanges; a shaft extended through the bearing and through the vertical flanges; and a frame mounted to swing on the shaft, outwardly of the vertical flanges.

2. In a device of the class described, a pair of angle brackets each including a horizontal flange and a vertical flange, the horizontal flange of one angle bracket being supplied with a forwardly extended hook, and being equipped with an inwardly extended fork, the horizontal flange of the other angle bracket carrying a depending arm; a bearing secured to the horizontal flanges of the angle brackets; a shaft extended through the bearing and through the vertical flanges of the angle brackets; and a frame mounted to swing on the shaft, outwardly of the vertical flanges.

3. Mechanism for connecting a vertically swinging frame with a tractor, comprising a pair of angle members having angularly disposed first and second flanges; attaching means mounted on the first flanges; a bearing secured to the first flanges; and a shaft mounted in the bearing and extended through the second flanges.

4. In a device for connecting a vertically swinging frame with a tractor, a pair of angle brackets comprising first and second flanges, one of the first flanges being supplied with a forwardly extended hook and being supplied with an inwardly extended fork, the first flange of the other angle bracket being equipped with a depending arm; a tubular bearing connected to the first flanges of the angle brackets; and a shaft extended through the bearings and through the second flanges of the angle brackets.

5. In a device for connecting a vertically swinging frame to a tractor, a pair of angle brackets each including a first flange and a second flange disposed at an angle thereto, the first flange of one angle bracket carrying a forwardly extended attaching element, and being provided with an inwardly extended attaching element, the first flange of the other angle bracket being equipped with a depending attaching element; a shaft extended through the second flanges of the angle brackets; and means assembled with the first flanges of the angle brackets for holding the angle brackets spaced.

6. The combination with the radiator base of a motor propelled vehicle, and members extended rearwardly from the base and defining an angle with the base, of a support extended across the vehicle and lodged in said angle, means for holding the support in place in said angle, a frame located in front of the vehicle of which the base constitutes a part, and means for mounting the frame on the support, for vertical swinging movement.

In testimony that I claim the foregoing as my own, I have hereto affixed my signature in the presence of two witnesses.

ALLEY CLAUD BOVENDER.

Witnesses:
J. V. BAUGUSS,
M. W. MATHIS.